Figure 1:
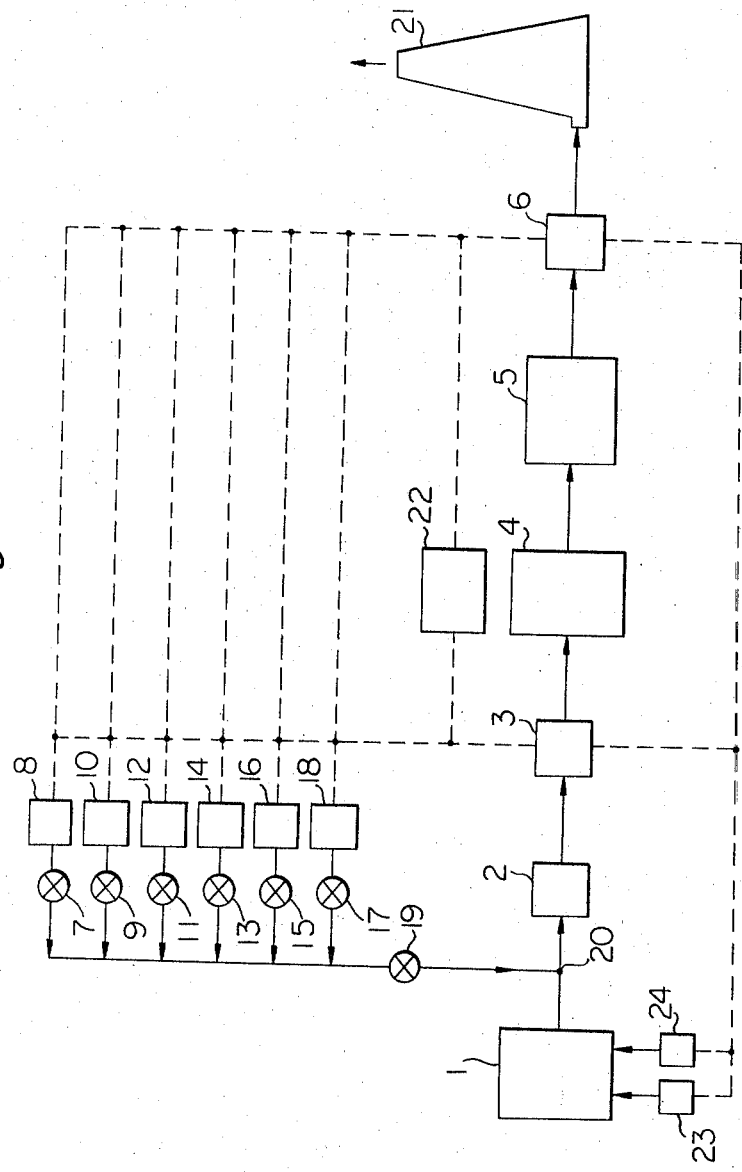

United States Patent [19]  
Machi et al.

[11] 3,869,362  
[45] Mar. 4, 1975

[54] PROCESS FOR REMOVING NOXIOUS GAS POLLUTANTS FROM EFFLUENT GASES BY IRRADIATION

[75] Inventors: Sueo Machi, Takasaki; Keita Kawamura, Yokohama; Waichiro Kawakami, Takasaki; Shingi Aoki, Fujisawa; Shoji Hashimoto; Keiichi Yotumoto, both of Takasaki; Hiromi Sunaga, Isesaki, all of Japan

[73] Assignees: Ebara Manufacturing Co., Ltd.; Japan Atomic Energy Research Institute, both of Tokyo, Japan

[22] Filed: Jan. 9, 1974

[21] Appl. No.: 431,925

[30] Foreign Application Priority Data
Jan. 11, 1973  Japan.................. 48-5607
Jan. 19, 1973  Japan.................. 48-7827
Aug. 15, 1973  Japan.................. 48-91547

[52] U.S. Cl................... 204/157.1 R, 204/157.1 H
[51] Int. Cl.............................................. B01j 1/10
[58] Field of Search............. 204/157.1 R, 157.1 H

[56] References Cited
UNITED STATES PATENTS
3,389,971  6/1968  Alliger.................. 204/157.1 S
3,653,185  4/1972  Scott.................... 55/103

Primary Examiner—Howard S. Williams  
Attorney, Agent, or Firm—Stevens, Davis, Miller & Mosher

[57] ABSTRACT

Noxious gas pollutants including NOx and $SO_2$ can be removed from effluent gases effectively and efficiently by regulating the $NOx/SO_2$ concentration ratio so as to be in the region of 0.1 – 3.0, preferably 0.5 – 1.5, before the gases are irradiated with an ionizing radiation or ultraviolet light. Convenient processes for carrying out said regulation include a process in which a pretreating means for removing NOx or $SO_2$ partly is placed before a reaction chamber. Circulation of the effluent gases between the reaction chamber and the collecting means, keeping the temperature in the collecting means at below the decomposition point of the reaction products, is efficacious for enhancing efficiency in removing said pollutants from the effluent gases.

9 Claims, 5 Drawing Figures

PROCESS FOR REMOVING NOXIOUS GAS POLLUTANTS FROM EFFLUENT GASES BY IRRADIATION

This invention relates to an improved process for removing pollutants from industrial effluent gases which are generated by various industrial processes. More particularly, the invention relates to treating industrial effluent gases with an ionizing radiation or ultraviolet light so that noxious gas pollutants, especially nitrogen oxides and sulfur dioxide may be changed into particles form or mist, thereby enabling collection of the particles or mist by conventional collecting means such as electrostatic precipitators, filters and the like.

Nowadays, a large amount of effluent gases is generated from various sources including various industrial plants, various combustion apparatuses, laboratories, engines of automobiles and the like. The whole amount of these effluent gases which is generated and released into the atmosphere every day throughout the country must be tremendous. These effluent gases generally include at least one pollutant selected from noxious gas pollutants such as: sulfur dioxide; nitrogen oxides of various forms (hereinafter referred to as NOx); ozone; carbon monoxide; carbon dioxide; hydrogen fluoride; hydrogen chloride and the like; and noxious particles such as: fly ash arising from mineral matter in coal, for example, aluminum silicate; coal dust or grit; coke dust; dust of roasted or unroasted concentrate arising from finely powdered raw material for metallurgy; mist of sulfuric acid; and the like. Many attempts have been made up to now, to remove these pollutants from the effluent gases before releasing them into the atmosphere, and many useful methods have been developed. However, among the above mentioned pollutants, sulfur dioxide ($SO_2$) and nitrogen oxides (NOx), particularly nitrogen oxides, are not easy to satisfactorily remove, and there have been, up to now, no processes proven to be advantage in practice. In addition, sulfur dioxide and nitrogen oxides are particularly noxious and harmful to the human body. Further, these pollutants are considered to be among the most important constituents of photochemical smog, which is now a matter of serious concern to those living in cities. Therefore, the present inventors' principal concern has been directed to the removal of $SO_2$ and NOx from the effluent gases. Thus, the following disclosure is made with particular reference to the removal of nitrogen oxides and sulfur dioxide. But, it will be understood that although the improved process of the present invention is particularly useful for removing $SO_2$ and NOx, it is also useful for removing the other pollutants as mentioned previously, and the entire object of the present invention is directed to providing effective and efficient process for purifying effluent gases to a satisfactory degree before releasing them into the atmosphere.

It is known that gaseous NOx and $SO_2$ can be converted to mist and/or solid particles by irradiating effluent gases containing them with an ionizing radiation or ultraviolet light. Nevertheless, the process has not yet been put into practice on industrial scale because of defects including cost problem and the like.

Accordingly, an object of the present invention is to provide an improved process for removing NOx and $SO_2$ from effluent gases by means of irradiation, which can be economically carried out and be put into practice on an industrial scale.

Another object of the present invention is to enhance efficiency in removing pollutants from effluent gases as much as possible.

These and other objects of the present invention can be attained according to the present invention by regulating or controlling the ratio of the NOx content to the $SO_2$ content (hereinafter referred to as "NOx/$SO_2$ ratio") so as to be in the region of 0.1 – 3.0, preferably 0.5 – 1.5, before the effluent gases are introduced into an irradiation chamber, where the gases are treated with irradiation. The above improvement of the invention has been accomplished based on the present inventors' discovery that the efficiency of removal of NOx and $SO_2$ is substantially increased, if the NOx/$SO_2$ ratio is regulated so as to be in the specific region as mentioned above before the gases are exposed to a radiation.

The following examples are to illustrate the characteristic "concentration ratio control effect" of the invention effective for obtaining the most efficient removal of said gas pollutants.

EXAMPLES 1 – 5

10 m³/hr of flue gases generated by combustion of B-grade heavy oil and having the $SO_2$ and the NOx contents as recited in the following Table 1 were treated with electron beam irradiation at a dose rate of $6.45 \times 10^5$ rad/sec for 4.5 seconds, namely for a total dose of 3.5 megarad, using a Cockcroft-Walton type electron beam accelerator. The $SO_2$ content of the gases were kept at around 1,000 ppm and the NOx content varied from 50 ppm to about 3,000 ppm. The $O_2$ content was kept at about 3 percent in each run, and the gas temperature about 150°C. In each example, the desulfurization ratio, which is the ratio of the $SO_2$ content of the treated gas to that of the untreated gas, and the denitration ratio, which is the ratio of the NOx content of the treated gas to that of the untreated gas, were determined respectively. The results are shown in the following Table 1 and also in FIG. 2 in the attached drawings.

Table 1

| Example No. | $SO_2$ content of gas at inlet of irradiation chamber (ppm) | NOx content of gas at inlet of irradiation chamber (ppm) | ratio of NOx to $SO_2$ (NOx/$SO_2$) | desulfurization ratio (%) | denitration ratio (%) |
|---|---|---|---|---|---|
| 1 | 1010 | 50 | 0.05 | 73 | ≅100 |
| 2 | 1020 | 100 | 0.1 | 91 | ≅100 |
| 3 | 1000 | 990 | 0.99 | ≅100 | ≅100 |
| 4 | 1010 | 1510 | 1.5 | ≅100 | ≅100 |
| 5 | 990 | 2870 | 2.9 | ≅100 | 90 |

The following Examples 6 and 7 are given as reference examples to illustrate the removal of pollutants, in case that the NOx/$SO_2$ ratio is out of the range of the invention as compared with the case in which said $NOx/SO_2$ ratio is within the specific range of the invention.

EXAMPLES 6 and 7

Table 2

| Example No. | $SO_2$ content of gas at inlet of irradiation chamber (ppm) | NOx content of gas at inlet of irradiation chamber (ppm) | ratio of NOx to $SO_2$ ($NOx/SO_2$) | desulfurization ratio (%) | denitration ratio (%) |
|---|---|---|---|---|---|
| 6 | 1000 | 50 | 0.05 | 74 | 99 |
| 7 | 1010 | 410 | 4.1 | ≅100 | 90 |

Example 6 was carried out under almost the same conditions as those in Examples 1 – 5 except that the $NOx/SO_2$ ratio was 0.05. The results are as shown in the above Table 2 and also in FIG. 2 shown hereinafter.

Example 7 was carried out under almost the same conditions as those in Examples 1 – 5 except that the $NOx/SO_2$ ratio was 4.1. The results are as shown in the above Table 2 and also in FIG. 2 shown hereinafter.

It is obvious from the above results that the desulfurization ratio is not satisfactory in Example 6, and that the denitration ratio is not satisfactory in Example 7.

Figure 2:
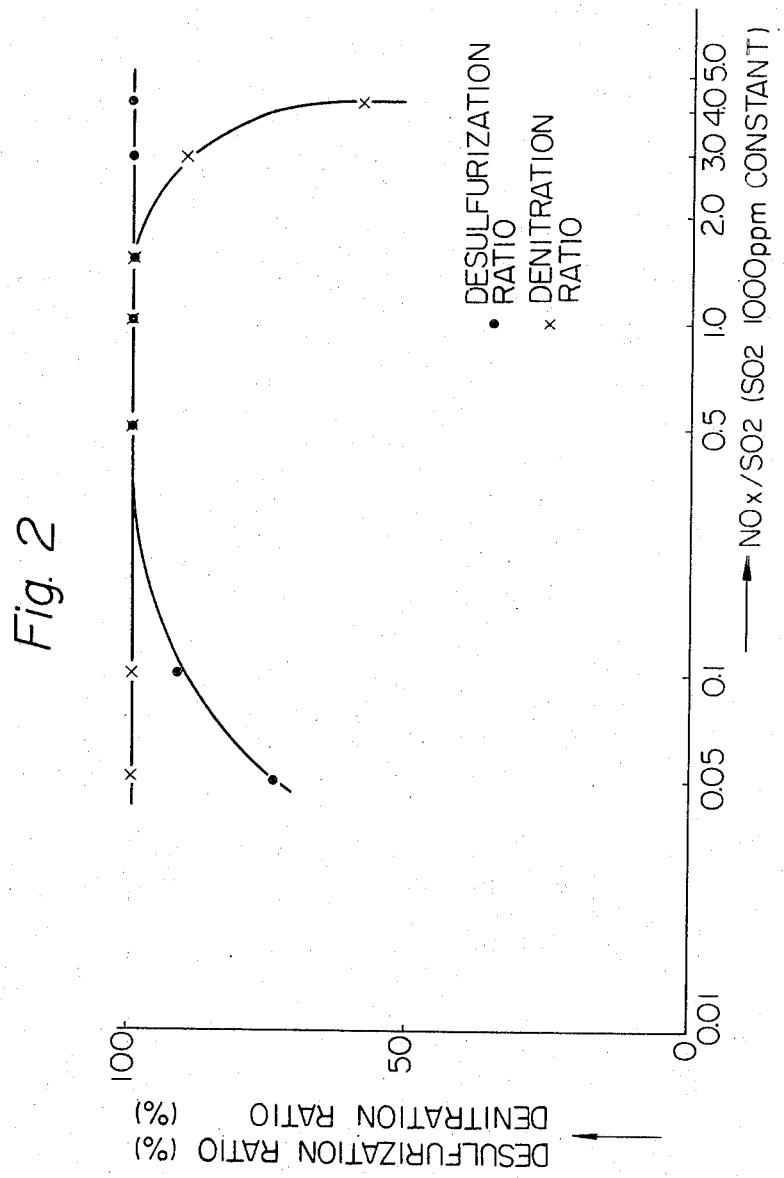

It is obvious from FIG. 2 that the desulfurization ratio is remarkably inferior when the $NOx/SO_2$ ratio is less than 0.1, and the denitration ratio is remarkably inferior when the $NOx/SO_2$ ratio is more than 3.0. In other words, it is preferable that the irradiation treatment of effluent gases is carried out under the condition that the $NOx/SO_2$ ratio is within the range of 0.1 – 3.0. And more, FIG. 2 clearly shows that both the desulfurization ratio and denitration ratio are very good when the $NOx/SO_2$ ratio is in the range of from 0.5 to 1.5.

EXAMPLE 8

B-grade heavy oil was burned in the combustion space of a heavy oil-boiler, regulating the ratio of fuel (B-grade heavy oil) to air to be 0.9, and the effluent gas generated thereby was analyzed. The $SO_2$ content was 1,020 ppm and the NOx content was 980 ppm. The effluent gas contained 2.9 percent by volume of oxygen. The stream of said effluent gas at a flow of 10 m³/hr was irradiated with an electron beam at a dose rate of $4.3 \times 10^5$ rad/sec for 4.5 seconds, namely for a total dose of 2 megarad, gas temperature being 150°C. The irradiated gas sample was taken and analyzed. The $SO_2$ content was 190 ppm and the NOx content 140 ppm.

EXAMPLE 9

B-grade heavy oil was burned in the boiler used in Example 8 on regulating the ratio of heavy oil to air so as to become 1.3 by decreasing the amount of air. To the stream of effluent gas generated thereby at a flow rate of 10 m³/hr, 200 liters/hr of air was added to control the oxygen content to become about 3%, and the $SO_2$ and NOx content was measured. The $SO_2$ content was 990 ppm and the NOx content 800 ppm. The effluent gas stream at a flow rate of 10 m³/hr was irradiated with an electron beam at a dose rate of $4.3 \times 10^5$ rad/sec for 4.5 seconds, namely for a total dose of 2 Mrad, the gas temperature being 150°C. The irradiated gas sample was taken for analysis of $SO_2$ and NOx. The $SO_2$ content was 280 ppm, and the NOx content was almost nil.

EXAMPLE 10

To the same effluent gas stream at a flow rate of 10 m³/hr as mentioned in Example 8, 200 liters/hr of oxygen gas stream was added to regulate the $O_2$ content of the resulting gas stream. The regulated effluent gas stream was then irradiated with an electron beam under the same irradiation conditions as those in Example 8. After irradiation gas sample was taken and analyzed. Almost nil of $SO_2$ and NOx were detected.

It is evident from the results of Examples 8 and 9, that the ratio of the NOx content to the $SO_2$ content can be controlled by controlling the conditions of combustion, and that by controlling said $NOx/SO_2$ ratio by the method as mentioned above, instead of doing so by decreasing the amount of NOx generation from combustion, noxious gas pollutants, NOx and $SO_2$, can be removed from the effluent gases more completely. And more, in the former case, calorific value of combustion is greater than in the latter case, and therefore the former case is preferable from an economical viewpoint. That is, in general, the higher the combustion temperature, the better the boiler efficiency. However, when the combustion temperature is high, NOx is produced abundantly, and the amount of NOx increases as the combustion temperature increases. Accordingly, combustion furnaces for boilers are often operated at lower temperatures than a maximum temperature employable, ignoring a few percentage reduction of the boiler efficiency, for the purpose of decreasing the amount of NOx as a byproduct of combustion. Operating combustion furnaces in such a way is, of course, very uneconomical. On the contrary, in the practice of the present invention, increasing the amount of Nox by raising the combustion temperatures is usually required or even preferred from the viewpoint of regulating the $NOx/SO_2$ concentration ratio so as to be in the region of 0.1 – 3.0, preferably 0.5 – 1.5, because said $NOx/SO_2$ ratio is usually lower than said region. Thus, the combustion furnaces can be operated at higher temperatures to obtain a maximum combustion efficiency, without worrying about the amount of NOx. As a result, the combustion efficiency is substantially improved. For example, when the combustion furnace is operated at temperatures in the region of 1,100° – 1,200°C, the boiler efficiency is expected to be in the region of 86 – 87 percent, with the NOx content of the effluent gas being in the region of 200 – 210 ppm. In contrast, when the combustion furnace is oparated at lower temperatures such as, for example, in the region of 850° – 900°C, intending to decrease the NOx content to the region of 80 – 50 ppm or lower, about 3 – 5 percentage reduction of the boiler efficiency is observed. Such reduction is substantial and will result in a significant cost increase, because the amount of the fuel consumed for boilers is large in general.

In the practice of the above mentioned process, the $NOx/SO_2$ ratio can be conveniently regulated by adding any of $SO_2$, $O_3$, $N_2$, $O_2$, air and the like singly or in combination from an extraneous sources, as occasion demands. FIG. 1, given hereinafter, shows one preferred example thereof. The process can, of course, be conveniently controlled automatically by interlocking necessary instruments with an automatic recording gas analyzer for checking the pollutant content, as shown in FIG. 1.

FIG. 1 shows a flow sheet of one preferred embodiment of the present invention.

FIG. 2 shows a graph of the relation between the ratio of NOx content to $SO_2$ content and the desulfurization or denitration ratio, plotted from experimental data obtained in Examples 1 – 10. Plotting in dot (·mark) accounts for data of the desulfurization ratio, and in cross (x mark) the denitration ratio. The numerical symbols account for the following, respectively.

1. various combustion furnaces and chemical plants from which effluent gases are generated;
2. a heat exchanger;
3. a gas analyzer for checking the $SO_2$ and NOx content;
4. a reaction chamber;
5. a mist and dust collector or a filter (collecting means);
6. a gas analyzer for checking the $SO_2$ and NOx content of the purified gas for discard into the atmosphere;
7. a valve for controlling the amount of air;
8. an air feeder;
9. a valve for controlling supplying amount of oxygen;
10. an oxygen feeder;
11. a valve for controlling supplying amount of ozone;
12. an ozone feeder;
13. a valve for controlling supplying amount of nitrogen;
14. a nitrogen feeder;
15. a valve for controlling supplying amount of NOx;
16. a NOx feeder;
17. a valve for controlling supplying amount of $SO_2$;
18. an $SO_2$ feeder;
19. a valve for controlling a flow rate of a total gas stream;
20. a feeding inlet;
21. a stack;
22. a radiation source (an ionizing radiation or ultraviolet light emitter);
23. an air feeder for combustion;
24. a fuel feeder.

It was also found by the present inventors that in the practice of the above mentioned method it is preferable to circulate the effluent gases to be treated between the reaction chamber and the collecting means, keeping the temperature of gases in the collecting zone at below the decomposition point of the reaction products of pollutants.

The most important characteristic of the process as mentioned above resides in that the reaction products formed in the irradiation zone are separated from the gas components rapidly as a result of rapid passing of gases through the irradiation zone, where the gaseous pollutants are converted to mist or solid products by irradiation, to thereby reach the collecting zone rapidly, where the products are removed from gases, the temperature of said collecting zone being kept at below the decomposition point of said products. After passing through the collecting zone, the purified gases yet containing the remaining unconverted gaseous pollutants are fed back to mix with the effluent gases before being treated by irradiation. Thus, the circulated gases are again treated by irradiation. As a result, it is expected that although the total staying time of the gas in the irradiation zone is the same, that is, although a total dose given to the gas is the same, the staying time of the reaction products in the irradiation zone is shortened as much as possible.

The improved process as mentioned above is based on the present inventors' discovery as follows. That is, they studied on the influence of the temperature in the irradiation zone on the desulfurization and denitration ratios in detail and found the following.

1. The reaction velocity of convertion of pollutants from gaseous NOx and $SO_2$ to mist and solid particles increases as the temperature increases.
2. At the temperature of from 150°C to 200°C or higher, the inverse reaction, that is the reaction of produced mist or solid particles decomposing into original gaseous pollutants, occurs, and the rate of the inverse, or decomposing reaction increases as the temperature increases.
3. Totally, as a result of simultaneous progress of said two reactions, the ratio of removal of $SO_2$ and NOx decreases as the temperature increases, when the temperature is in the range of from 150°C to 200°C or higher.
4. The decomposition temperature of mist or solid particles varies depending on the compositions thereof.

The observed results as mentioned above lead the present inventors to the conclusion that it is the most effective for obtaining the best efficiency in removal of pollutants, to move, as soon as possible, the mist or solid particles produced in the reaction chamber to the collecting zone where the temperature is kept at below the decomposition point of the reaction products, followed by returning the separated gases containing only the remaining unreacted gaseous pollutants to the reaction chamber together with the effluent gases before treating. It is understood that according to the above mentioned process, the reaction chamber can be kept at the most suitable temperature for converting gaseous pollutants into mist or solid products without considering much of the inverse, or decomposition reaction.

In the practice of the above method, the ratio of the amount of circulating gas to the amount of the original gas to be treated is in the range of from 2 to 3 in general and preferably in the range of 10 or more. In other words, the amount of circulating gas is from 2 to 3 times, preferably 10 or more times that of the gas originally introduced to the process. Preferably, the ratio is taken greater as the decomposition point of products decreases. Time required for the gas to pass through the reaction chamber once is generally in the range of from 0.1 second to 60 seconds. The lower the decomposition point of the reaction products, the shorter the time required for the gas to pass through the reaction chamber.

In the practice of the method as mentioned above, the temperature in the reaction chamber is usually in the range of from room temperature to about 500°C. However, in order to avoid corrosion of the reactor, the temperature is preferably kept at above a dew point of the effluent gas to be treated.

The temperature in the collecting means must be kept at below the decomposition point of the reaction products. Usually, the temperature within the range of from 150°C to 200°C can be conveniently employed, although it is variable depending on the compositions of the effluent gases to be treated. It should be noted that the temperature must be determined considering also the dew point of the effluent gas to avoid corrosion of the reactor.

The following is to illustrate one preferred embodiment of the invention, referring to the flow sheet thereof shown in the drawing.

Figure 3:
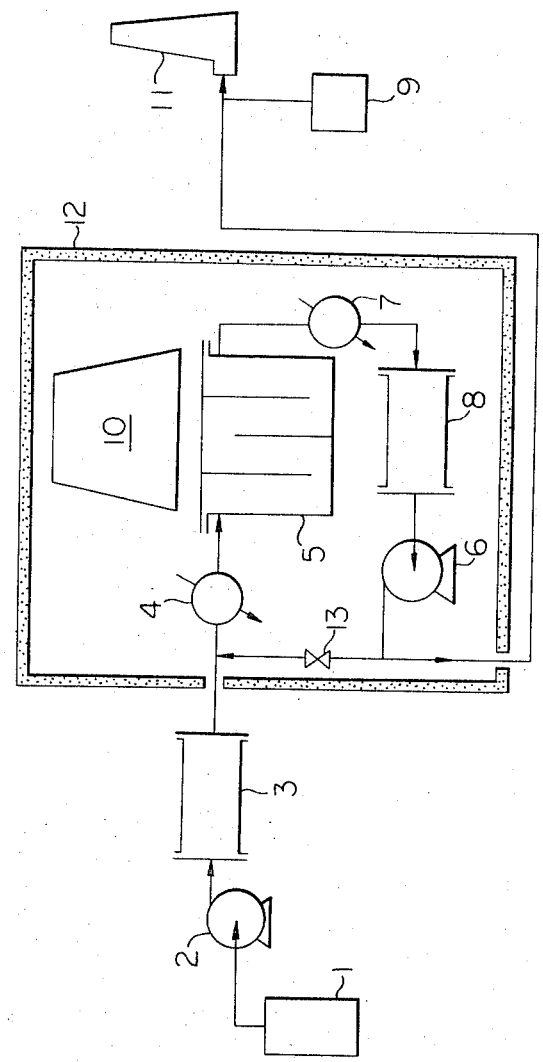

Referring now to FIG. 3, the effluent gas to be treated is generated by combustion of heavy oil in the heavy oil combustion apparatus 1. The gas is then delivered to the preliminary dust collector 3 by a blower 2. The solid pollutants in the gas are removed from the gas in said dust collector 3, and then the gas moves to a heat exchanger 4, where the temperature is controlled before the gas enters a reaction chamber 5. In the reaction chamber 5, the gas is irradiated with electron beams from an accelerator 10. As a result, the gaseous pollutants, $SO_2$ and $NOx$, contained in the gas are converted to mist and solid particles. The effluent gas containing these reaction products is then delivered by a circulation blower 7 to a collecting means 8 after passing through a heat exchanger 7 to control the temperature of the gas. In the collector 8, the mist and solid products are removed from the gas. Then, part of the purified gas is sent to a stack 11 for discard into the atmosphere after passing through a gas analyzer 9 for checking the $SO_2$ and $NOx$ content. The balance of the purified gas is returned to the reaction chamber 5 to be treated again by irradiation. The shielding wall to limit the radiation therein is shown in the FIG. 3 as 12.

The following examples are to illustrate the advantages of the above mentioned process in which part of the gas is circulated between the reaction chamber and the collecting means and the temperature in the collecting means is kept at below the decomposition point of the reaction products.

EXAMPLES 11 – 17

Cockcroft-Walton type electron beam generator was used as a radiation source. A reaction chamber having the capacity of 12.5 liters (50 × 500 × 500) and three turbulating plates placed therein as shown in FIG. 3 was used. The irradiation was carried out so that the effluent gas was exposed to the radiation evenly. Electrostatic precipitators having the inner diameter 100 mm in diameter and the length of 1,000 mm were used as a preliminary dust collector corresponding to 3 in FIG. 3 and as a collector corresponding to 8 in FIG. 3 respectively. The voltage each of these two electrostatic precipitators was 12,000 volts. The effluent gas to be treated was obtained by combustion of what is called "B-grade heavy oil." The $SO_2$ and $NOx$ content was up to 1,200 ppm and up to 300 ppm, respectively. The dose rate was $4.3 \times 10^5$ rad/sec and the flow-rate of circulating gas was 40 m³/hr except in the case of Example 15, wherein the flow-rate of circulating gas was 80 m³/hr. The variation of the desulfurization and denitration ratios depending on the temperature change is shown in the Table 3 below.

Table-3

| Example No. | Temp. at reaction chamber (°C) | Temp. at collecting zone (°C) | Desulfurization ratio (%) | Denitration ratio (%) |
|---|---|---|---|---|
| 11 | 110 | 110 | 74 | 82 |
| 12 | 150 | 110 | 84 | 88 |
| 13 | 195 | 110 | 91 | 95 |
| 14 | 245 | 110 | 84 | 93 |
| 15* | 245 | 110 | 95 | 97 |
| 16 | 195 | 150 | 89 | 94 |
| 17 | 195 | 195 | 87 | 89 |

* flow rate of circulating stream : 80 m³/hr

As is evident from the above Table 3, the desulfurization and denitration ratios increase as the temperature in the reaction chamber increases.

In Example 14, a slight drop of the desulfurization ratio was observed. However, as is clear from the result of Example 15, high desulfurization and denitration ratios were obtained, when the amount of circulating gas stream was increased.

The following Examples are given for the purpose of references, to emphasize the effects based on the gas circulation and the temperature control in the collecting means.

EXAMPLES 18 – 22

According to the flow sheet as shown in FIG. 3, but with the valve 13 being closed, that is, without gas circulation, and without controlling the gas temperature in the collector 8, the process was carried out similarly as in Examples 11 – 17. The results are shown in Table 4 below.

Table 4

| Example No. | Temp. at reaction chamber (°C) | Temp. at collecting means (°C) | Desulfurization ratio (%) | Denitration ratio (%) |
|---|---|---|---|---|
| 18* | 110 | 110 | 73 | 81 |
| 19* | 150 | 110 | 79 | 84 |
| 20* | 195 | 110 | 80 | 83 |
| 21* | 245 | 110 | 62 | 71 |
| 22** | 245 | 245 | 65 | 74 |

*no circulation
**flow rate of circulating stream : 40 m³/hr

By comparing the results of Examples 11 – 14 with those of Examples 18 – 21, it is clear that the local gas circulation in the process is efficacious and that the increase of the pollutant removal ratio is remarkable when the irradiation is carried out at high temperatures.

It is understood that according to the improved method as mentioned above, mist and solid particles produced in the reaction chamber can be rapidly collected before they are decomposed to become gaseous pollutants again. And, as a result, the desulfurization and denitration can be carried out more effectively than in cases including no gas circulation.

Alternatively, the ratio of $NOx$ content to $SO_2$ content of the effluent gasses can be regulated so as to be in the desired range by putting a preliminary treator for removing either $SO_2$ or $NOx$ partly, at a position before the reaction chamber. That is, the gas pollutants, $NOx$ and $SO_2$, are partly removed from the original gasses by some of suitable conventional means for desulfurization or denitration before the gases are delivered to the irradiation chamber, where the gasses are treated with irradiation. Suitable pretreating means include chemical desulfurizing or denitrizing means such as washing in a tower and the like.

For example, when the effluent gas which contains a large amount of $SO_2$ and a small amount of NOx, the ratio of NOx to $SO_2$ being less than 0.1, is treated, the effluent gas is treated as follows according to one preferred embodiment of the present invention.

Figure 4:
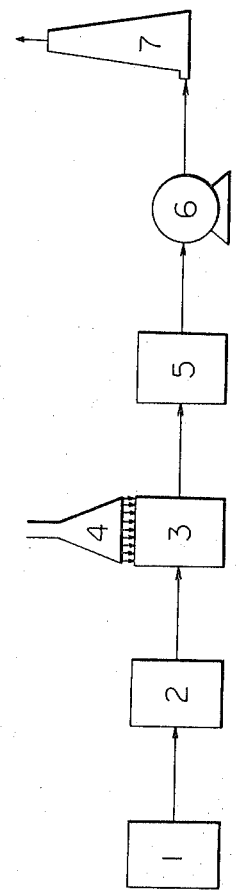

Referring now to FIG. 4, the effluent gas generated from a certain plant or furnace 1 is first delivered to a simple desulfurization equipment 2, where part of $SO_2$ is removed from the gas. The advantage is that a rough desulfurization is allowable in the pretreator 2 so long as the $NOx/SO_2$ ratio of the treated gas is in the range of from 0.1 to 3.0, preferably from 0.5 to 1.5. The thus treated effluent gas then enters a reaction chamber 5, where the gas is irradiated with a radiation such as, for example, an electron beam, from a radiation source 4 such as, for example, an electron beam accelerator. As a result of irradiation treatment here, the gaseous $SO_2$ and NOx contained in the effluent gas are converted to mist or solid particles. Then, the effluent gas having the mist and solid particles is delivered to a collecting means 5, where the particles are removed from the gas and the gas is sent to a stack 7 for discard into the atmosphere.

In case the effluent gases are treated by the method as mentioned previously in which the ratio of NOx content to $SO_2$ content is regulated by the addition of NOx or the like before the effluent gases are irradiated with a radiation, a large amount of NOx or the like is required, and as a result the increased dose rate is required. Thus, the greater capacity of a radiation source, for example a costly high power accelerator, is required.

In contrast, if the $NOx/SO_2$ ratio is regulated by said pretreatment method such as, for example, a simple chemical means such as washing with an aqueous alkali solution, the subsequent irradiation treatment of the effluent gas is carried out more economically.

The advantages of the pretreatment method are summarized as follows.

1. A large amount of NOx gas for regulating the $NOx/SO_2$ ratio can be cancelled.
2. The desulfurization ratio in the preliminary desulfurizer 2 as shown in FIG. 4 is not necessarily limited to the strict range such as 90 percent or more, but only rough desulfurization is expected to be carried out in the preliminary desulfurizer.

Thus, a simple apparatus such as a scrubber may be satisfactorily employed.

3. The preliminary removal of part of $SO_2$ decreases the $SO_2$ content of the gas to be treated, which will be course decrease the total dose required for converting gaseous $SO_2$ to mist or solid particles.

Figure 5:
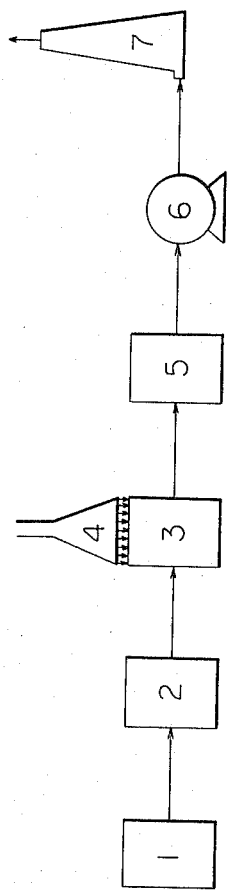

FIG. 5 shows a flow sheet of another preferred embodiment of the invention in which a preliminary denitrizer 2 is employed instead of the preliminary desulfurizer in FIG. 4. This is applicable to the case in which the effluent gas, NOx in rich and $SO_2$ in poor, is treated.

Although the invention has been described in considerable detail with reference to certain preferred embodiments thereof, it will be understood that variations and modifications can be effected without departing from the spirit and scope of the invention as described hereinabove and as defined in the appended claims.

What is claimed is:

1. A process for removing NOx and $SO_2$ from effluent gases comprising
   regulating the ratio of the NOx content to the $SO_2$ content so as to be in the region of 0.1 - 3.0 before the gases are delivered to a reaction chamber inlet,
   moving said gases through said reaction chamber and at the same time irradiating them with an ionizing radiation or ultraviolet light from a radiation source which is placed near or in said reaction chamber, thereby converting gaseous pollutants including NOx and $SO_2$, to mist and/or solid particles, and then
   collecting the particles thus produced by a mist and dust collector.

2. The process of claim 1 in which the ratio of the NOx content to the $SO_2$ content is regulated so as to be in the region of 0.5 -1.5.

3. The process of claim 2 in which the regulation of the $NOx/SO_2$ concentration ratio is carried out by pretreating the effluent gases in a pretreating apparatus which is placed before the reaction chamber, in order to remove part of the NOx or $SO_2$ so as to regulate said concentration ratio.

4. The process of claim 1 in which the regulation of the $NOx/SO_2$ concentration ratio is carried out by pretreating the effluent gases in a pretreating apparatus which is placed before the reaction chamber, in order to remove part of the NOx or $SO_2$ so as to regulate said ratio.

5. The process of claim 1, in which the regulation of $NOx/SO_2$ concentration ratio is carried out by burning fuels at a maximum allowable temperature, instead of burning at lower temperatures to decrease the amount of NOx to be generated.

6. The process of claim 1 in which the gas temperature in the collecting means is kept at below the decomposition point of the reaction products of pollutants.

7. A process for removing NOx and/or $SO_2$ from effluent gases, comprising
   delivering the effluent gases to a reaction chamber inlet,
   moving said gases through the reaction chamber and at the same time irradiating them with an ionizing radiation or ultraviolet light from a radiation source placed near or in the reaction chamber, thereby converting gaseous pollutants, NOx and/or $SO_2$, to mist and/or solid particles, and then
   collecting the particles thus produced by a collecting means, the gas temperature therein being kept at below the decomposition point of said reaction product.

8. A process for removing NOx and/or $SO_2$ from effluent gases, comprising
   delivering the effluent gases to a reaction chamber inlet,
   moving said gases through the reaction chamber and at the same time irradiating them with an ionizing radiation or ultraviolet light from a radiation source which is placed near or in said reaction chamber, thereby converting gaseous pollutants, NOx and/or $SO_2$, to mist and/or solid particles,
   delivering the irradiated gases with the particles as reaction products to a collecting means, where said reaction products are collected,
   returning a part of the gases thus treated to the reaction chamber to be irradiated again, and releasing the balance of the purified gases into the atmosphere through a stack.

9. A process for removing NOx and/or $SO_2$ from effluent gases, comprising delivering the effluent gases to a reaction chamber inlet, moving said gases through the reaction chamber and at the same time irradiating them with an ionizing radiation or ultraviolet light from a radiation source which is placed near or in said reaction chamber, thereby converting gaseous pollutants, NOx and/or $SO_2$, to mist and/or solid particles, delivering the irradiated gases with the particles as reaction products to a collecting means, where said reaction products are collected, returning a part of the gases thus treated to the reaction chamber to be irradiated again, and releasing the balance of the purified gases into the atmosphere through a stack, the gas temperature in the collecting means being kept at below the decomposition point of said reaction products.

* * * * *

REEXAMINATION CERTIFICATE (194th)
United States Patent [19]
Machi et al.

[11] B1 3,869,362

[45] Certificate Issued May 22, 1984

[54] PROCESS FOR REMOVING NOXIOUS GAS POLLUTANTS FROM EFFLUENT GASES BY IRRADIATION

[75] Inventors: Sueo Machi, Takasaki; Keita Kawamura, Yokohama; Waichiro Kawakami, Takasaki; Shingi Aoki, Fujisawa; Shoji Hashimoto; Keiichi Yotumoto, both of Takasaki; Hiromi Sunaga, Isesaki, all of Japan

[73] Assignees: Ebara Manufacturing Co., Ltd.; Japan Atomic Energy Research Institute, both of Tokyo, Japan

Reexamination Request:
No. 90/000,309, Dec. 21, 1982

Reexamination Certificate for:
Patent No.: 3,869,362
Issued: Mar. 4, 1975
Appl. No.: 431,925
Filed: Jan. 9, 1974

[30] Foreign Application Priority Data

Jan. 11, 1973 [JP] Japan .................................. 48-5607
Jan. 19, 1973 [JP] Japan .................................. 48-7827
Aug. 15, 1973 [JP] Japan .................................. 48-91547

[51] Int. Cl.$^3$ ............................................ B01J 19/12

[52] U.S. Cl. ...................... 204/157.1 R; 204/157.1 H
[58] Field of Search ................. 204/157.1 P, 157.1 H, 204/157.1 R

[56] References Cited

U.S. PATENT DOCUMENTS

3,334,020   8/1967   Deutsch et al. ...................... 176/39

OTHER PUBLICATIONS

Journal of Japan Atomic Energy Society, vol. 14, No. 11 (1972) pp. 597–599 (translation).

*Primary Examiner*—Howard S. Williams

[57] ABSTRACT

Noxious gas pollutants including $NO_x$ and $SO_2$ can be removed from effluent gases effectively and efficiently by regulating the $NO_x/SO_2$ concentration ratio so as to be in the region of 0.1–3.0, preferably 0.5–1.5, before the gases are irradiated with an ionizing radiation or ultraviolet light. Convenient processes for carrying out said regulation include a process in which a pretreating means for removing $NO_x$ or $SO_2$ partly is placed before a reaction chamber. Circulation of the effluent gases between the reaction chamber and the collecting means, keeping the temperature in the collecting means at below the decomposition point of the reaction products, is efficacious for enhancing efficiency in removing said pollutants from the effluent gases.

REEXAMINATION CERTIFICATE ISSUED UNDER 35 U.S.C. 307.

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–6 is confirmed.

Claims 8 and 9, having been finally determined to be unpatentable, are cancelled.

Claim 7 is determined to be patentable as amended:

7. A process for removing $NO_x$ and/or $SO_2$ from effluent gases, comprising
[delivering the] *establishing* gases [to] *containing $NO_x$ and $SO_2$ in a ratio in the range of 0.1–3.0 in* a reaction chamber [inlet],
moving said gases through the reaction chamber and at the same time irradiating them with an ionizing radiation or ultraviolet light from a radiation source placed near or in the reaction chamber, thereby converting gaseous pollutants, $NO_x$ and/or $SO_2$, to mist and/or solid particles, and then
collecting the particles thus produced by a collecting means, the gas temperature therein being kept at below [the decomposition point of said reaction product] *150° C.*

* * * * *